United States Patent
Hellman et al.

(10) Patent No.: US 9,016,778 B2
(45) Date of Patent: Apr. 28, 2015

(54) INFLATABLE/DEFLATABLE SEAT WITH STOWABLE COLLAPSING FRAME

(71) Applicant: Ford Global Technologies, LLC, Dearborn, MI (US)

(72) Inventors: Kristin Ann Hellman, Walled Lake, MI (US); Ryan Welch, Ottawa Lake, MI (US); Christopher Harold Stone, Northville, MI (US); Jeffrey M. Nowak, Huntington Woods, MI (US); Artur Sakarian, Birmingham, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/033,056

(22) Filed: Sep. 20, 2013

(65) Prior Publication Data

US 2015/0084386 A1    Mar. 26, 2015

(51) Int. Cl.
| | |
|---|---|
| *A47C 7/62* | (2006.01) |
| *B60R 7/04* | (2006.01) |
| *A47C 4/54* | (2006.01) |
| *B60N 2/02* | (2006.01) |
| *B60N 3/10* | (2006.01) |

(52) U.S. Cl.
CPC . *B60R 7/043* (2013.01); *A47C 4/54* (2013.01); *B60N 2/02* (2013.01); *A47C 7/62* (2013.01); *B60N 3/10* (2013.01); *B60N 3/101* (2013.01)

(58) Field of Classification Search
CPC ............ A47C 7/62; B60R 7/043; B60N 3/10; B60N 3/101

USPC .......................................... 297/188.09, 188.1
See application file for complete search history.

(56) References Cited

U.S. PATENT DOCUMENTS

| | | | | |
|---|---|---|---|---|
| 3,099,482 | A * | 7/1963 | Woodruff, Sr | 297/188.09 |
| 3,594,039 | A * | 7/1971 | Harp | 297/188.1 X |
| 4,717,202 | A * | 1/1988 | Batchelder et al. | 297/188.09 X |
| 5,511,853 | A * | 4/1996 | Wallis | 297/188.1 X |
| 5,902,009 | A * | 5/1999 | Singh et al. | 297/188.1 |
| 5,911,471 | A * | 6/1999 | Benedict et al. | 297/188.09 X |
| 5,913,571 | A * | 6/1999 | Dystra et al. | 297/188.1 X |
| 5,957,521 | A * | 9/1999 | Schlachter | 297/188.09 X |
| 6,106,044 | A * | 8/2000 | Schlachter | 297/188.09 X |
| 6,386,612 | B2 * | 5/2002 | Hofmann et al. | 296/37.15 |
| 6,386,629 | B1 * | 5/2002 | Severinski et al. | 297/188.1 |
| 6,540,279 | B1 * | 4/2003 | Bargiel | 296/65.05 |
| 6,824,029 | B2 * | 11/2004 | Tuel et al. | 297/188.09 X |
| 6,837,531 | B2 * | 1/2005 | Mack et al. | 297/188.1 X |
| 6,869,121 | B2 * | 3/2005 | Kayumi et al. | 297/188.1 X |

(Continued)

OTHER PUBLICATIONS

"2013 Dodge Journey Review," ConsumerGuide Automotive, http://www.consumerguide.com/dodge/journey/, Feb. 23, 2013 (6 pages).

*Primary Examiner* — Rodney B White
(74) *Attorney, Agent, or Firm* — Raymond Coppiellie; Price Heneveld LLP (57) ABSTRACT

A vehicle seating assembly comprises a base having an upper rim and a receptacle below the rim, a seatback having upper and lower sections operable at an intermediate hinge between opened and closed positions and frame members operably coupling the base with the seatback, and operable between a use position, wherein the seatback is above the base, and a stowed position, wherein the seatback is in front of and below the rim.

19 Claims, 9 Drawing Sheets

(56) References Cited

U.S. PATENT DOCUMENTS

| | | | |
|---|---|---|---|
| 6,877,807 B2 | 4/2005 | Mizuno et al. | |
| 6,929,306 B2 * | 8/2005 | Mack et al. | 297/188.1 X |
| 6,981,730 B2 | 1/2006 | Bixby | |
| 7,121,606 B2 * | 10/2006 | Khan et al. | 297/188.1 X |
| 7,300,088 B1 * | 11/2007 | Catenacci et al. | 296/37.15 |
| 7,517,014 B2 * | 4/2009 | Schroeder et al. | 297/188.09 |
| 7,677,655 B2 * | 3/2010 | Marsh | 297/188.1 X |
| 7,819,468 B2 * | 10/2010 | Tsuda et al. | 297/188.1 |
| 8,002,350 B2 * | 8/2011 | Johnson | 297/188.1 X |
| 8,235,445 B2 | 8/2012 | Jones et al. | |
| 2002/0005649 A1 * | 1/2002 | Hofmann et al. | |
| 2011/0266855 A1 | 11/2011 | Zimmerman, II | |
| 2013/0038080 A1 | 2/2013 | Tate, Jr. | |
| 2013/0113233 A1 | 5/2013 | Kim et al. | |
| 2013/0313869 A1 * | 11/2013 | Aguirre et al. | 297/188.09 |

* cited by examiner

INFLATABLE/DEFLATABLE SEAT WITH STOWABLE COLLAPSING FRAME

FIELD OF THE INVENTION

The present invention generally relates to collapsible vehicle seats, and more specifically, an inflatable and deflatable vehicle seat with a collapsible frame.

BACKGROUND OF THE INVENTION

Various automobile seating designs include the capability to collapse various seats within the vehicle to provide additional storage space within the vehicle. In smaller vehicles, these seating designs typically include a single folding seatback that, when folded, provides a platform above the seat that can either form an individual storage space or an extension of the trunk storage area. The storage area provided by these seating designs is limited by the size and bulkiness of the seat components, wherein the seat is typically in a fixed position within the automobile cabin.

SUMMARY OF THE INVENTION

According to one aspect of the present invention, a vehicle seating assembly includes a base having an upper rim and a receptacle below the rim. A seatback having upper and lower sections is operable at an intermediate hinge between open and closed positions. Frame members operably couple the base with the seatback, and are operable between a use position, wherein the seatback is above the base, and a stowed position, wherein the seatback is in front of and below the rim.

According to another aspect of the present invention, a vehicle seating assembly includes a base having forward and rearward walls that define a receptacle. A seat cushion is positioned over the receptacle. A foldable seatback is disposed proximate the base and is operable between open and closed positions. Frame members support the foldable seatback. The frame members are operable between an upright use position above the rearward wall, and a downward stowed position in front of the forward wall.

In yet another aspect of the present invention, a selectively inflatable and stowable seat for a vehicle includes a base having a rim and defining a receptacle below the rim. A seatback having upper and lower sections is operable at a hinge between opened and closed positions. Frame members are connected between the base and the hinge, and are operable between a use position, wherein the seatback is in the open position and disposed above the base, and a stowed position, wherein the seatback is in the closed position and disposed in front of the base.

These and other aspects, objects, and features of the present invention will be understood and appreciated by those skilled in the art upon studying the following specification, claims, and appended drawings.

DETAILED DESCRIPTION OF EMBODIMENTS

Figure 1:
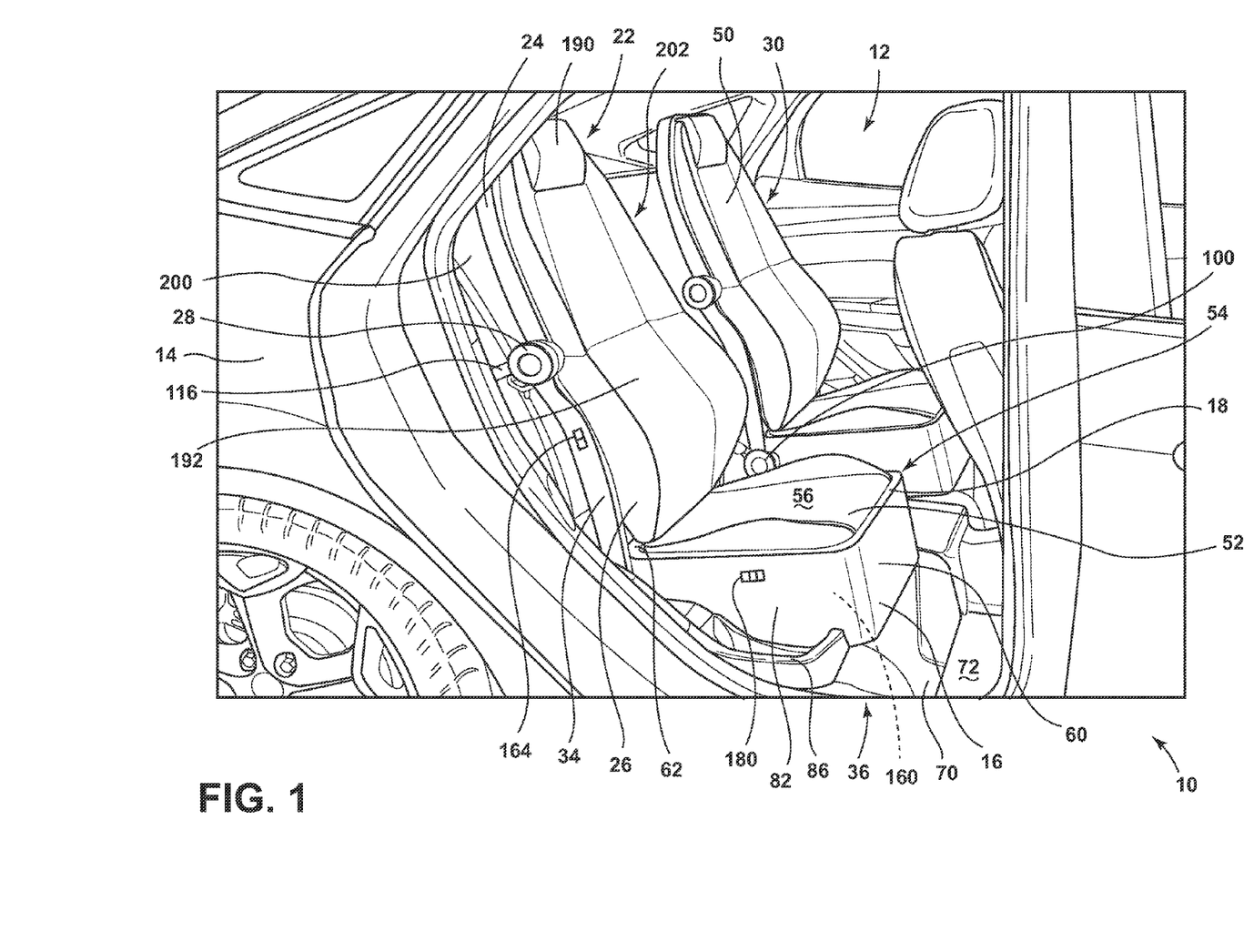
FIG. 1 is a side perspective view of a vehicle with an embodiment of a vehicle seating assembly in the inflated and use positions.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIG. 1, reference numeral 10 generally refers to a stowable rear seat shown installed within a cabin 12 of a vehicle 14, according to one embodiment. The stowable rear seat 10 includes a base 16 having an upper rim 18 and a receptacle 20 disposed below the rim 18. A seatback 22 having upper and lower sections 24, 26 is operable at an intermediate hinge 28 between open and closed positions 30, 32. Frame members 34 operably couple the base 16 to the seatback 22 and are operable between a use position 36, wherein the seatback 22 is above the base 16, and a stowed position 38, wherein the seatback 22 is in front of and below the rim 18.

Figure 5:
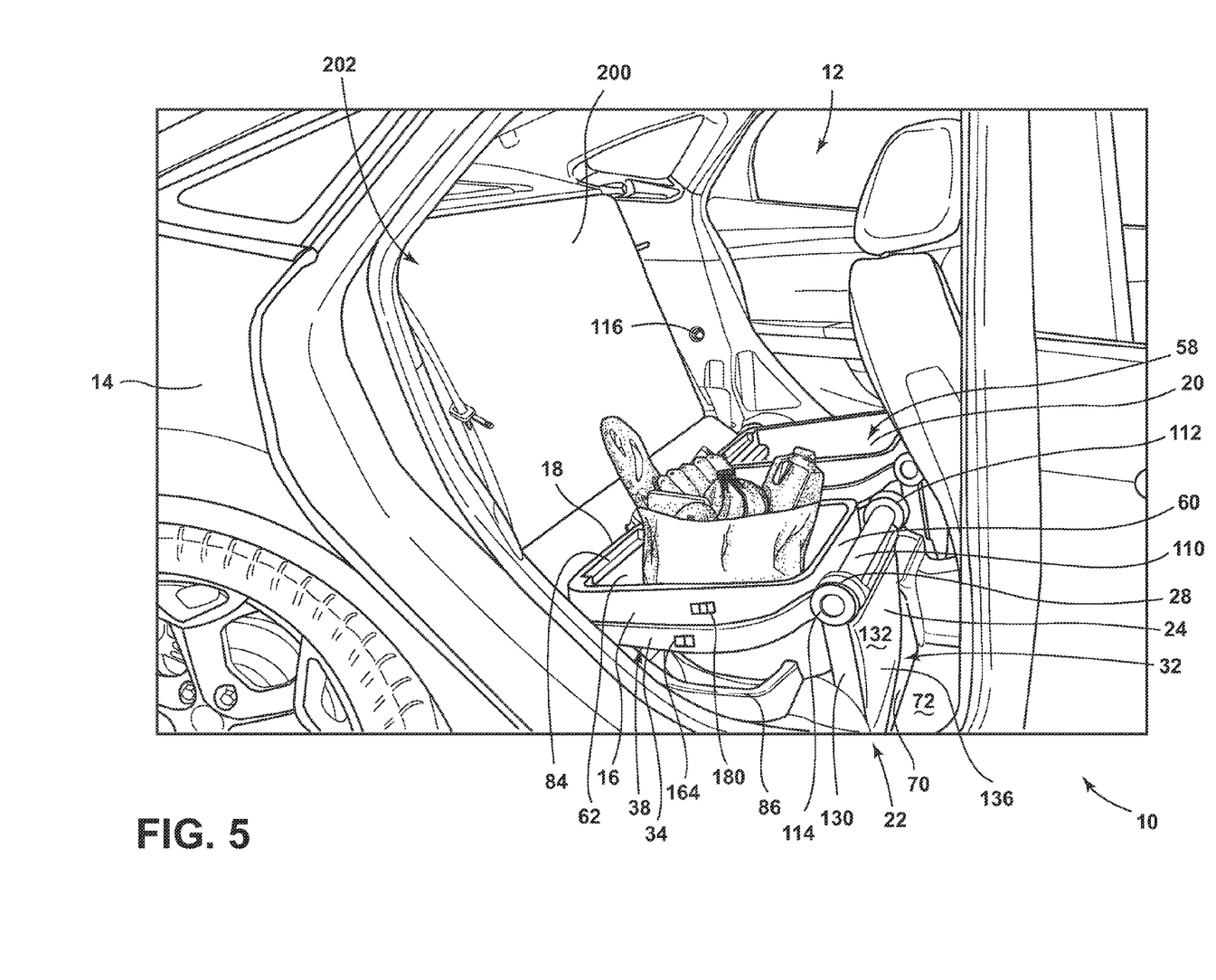
FIG. 5 is a side perspective view of the embodiment of FIG. 4 with items placed within a base.
Figure 6:
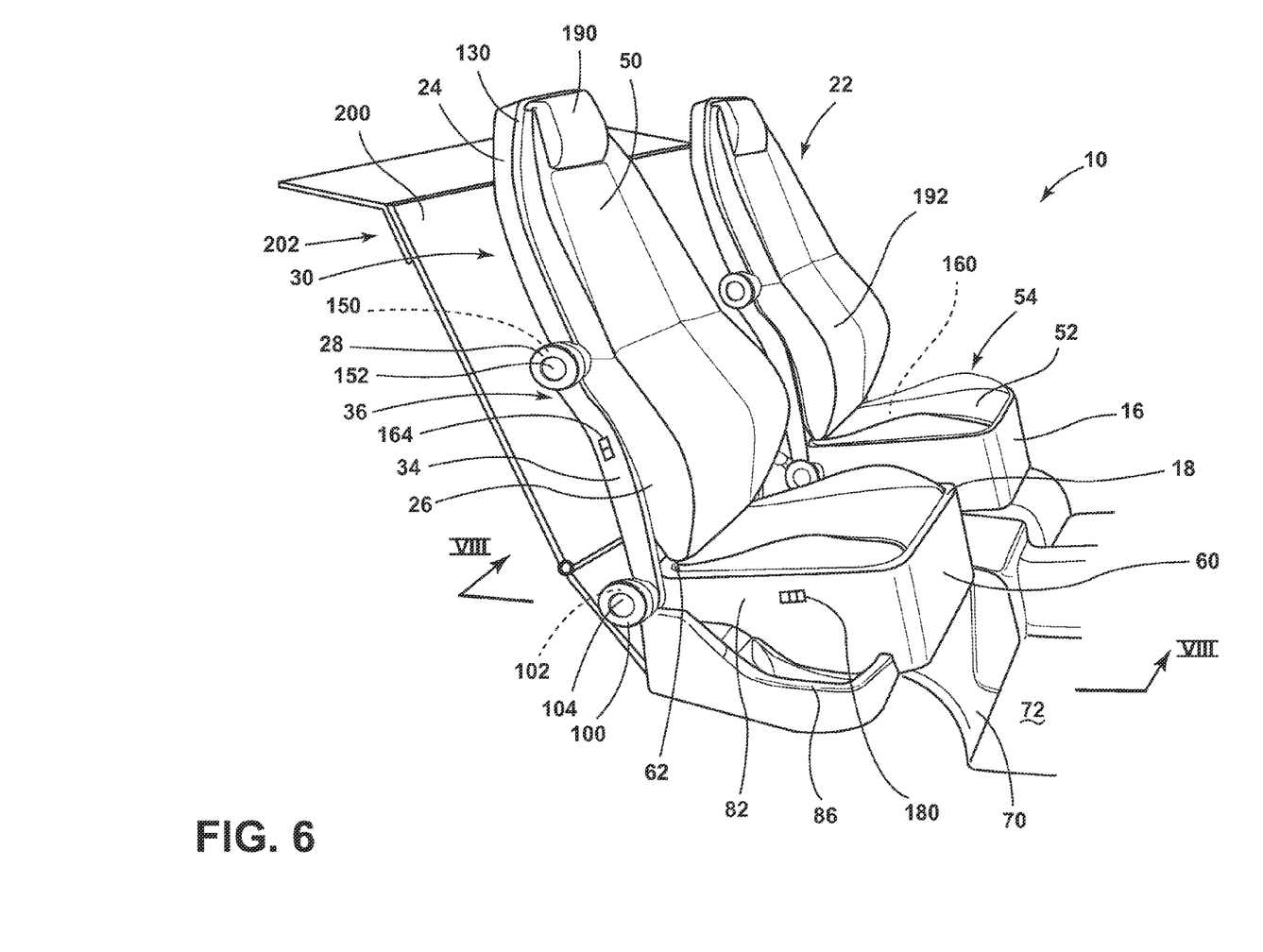
FIG. 6 is a side perspective view of the vehicle seating assembly of FIG. 4 removed from the vehicle and in the use position.
Figure 7:
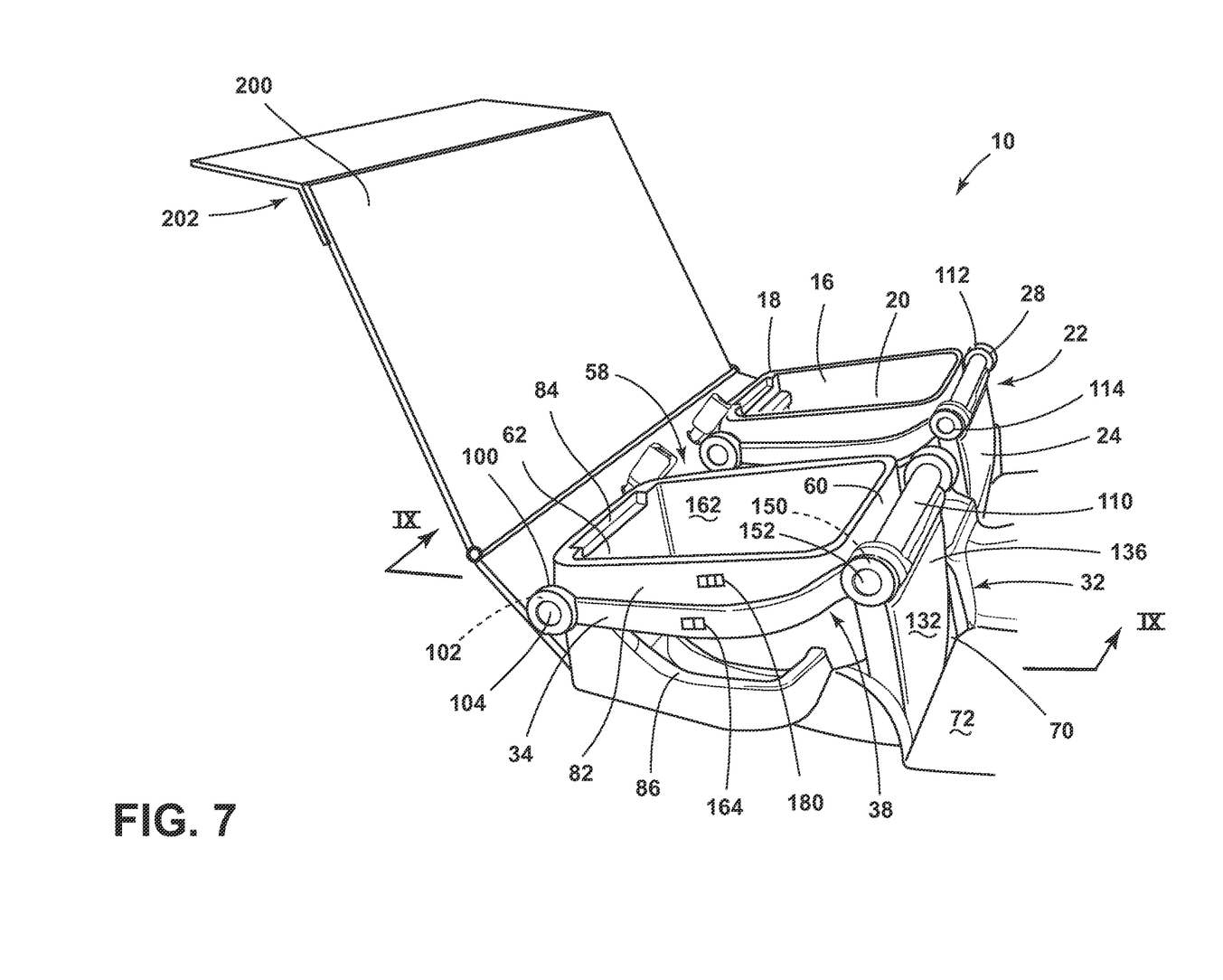
FIG. 7 is a side perspective view of the vehicle seating assembly of FIG. 4 removed from the vehicle and disposed in the stowed position.

As illustrated in FIGS. 1-4, the seatback 22 includes a selectively inflatable back cushion 50, wherein the back cushion 50 is deflated in order to remove the seatback 22 from the open position 30 to be disposed into the closed position 32. The base 16 of the stowable rear seat 10 includes a selectively inflatable seat cushion 52 operable between an inflated seating position 54, wherein a top surface 56 of the seat cushion 52 extends above the rim 18 of the base 16, and a deflated storage position 58, wherein the seat cushion 52 is stored in the receptacle 20. The base 16 also includes forward and rearward walls 60, 62 that further define the receptacle 20. As illustrated in FIG. 1, when the frame members 34 are in the upright use position 36, the foldable seatback 22 is positioned above the rearward wall 62. When the frame members 34 are disposed in the downward stowed position 38, the foldable seatback 22 is in front of the forward wall 60 and below the rim 18. In this manner, the seatback 22 is moved clear of the rim 18 of the base 16, and the receptacle 20 defined by the base 16 is fully accessible for the placement of items disposed therein, as illustrated in FIG. 5.

As again illustrated in FIGS. 1-4, the area in front of the forward wall 60 of the base 16, which receives the folded seatback 22 in the downward stowed position 38, can be further defined by a concave portion 70 of a floor surface 72 of the vehicle 14, wherein the concave portion 70 extends below the floor surface 72. In this manner, the folded seatback 22 in the downward stowed position 38 can be maintained below the rim 18 of the base 16, while also allowing the base 16 to maintain a height that is convenient and comfortable for seating, for occupants of the rear of the cabin 12 of the vehicle 14, when the stowable rear seat 10 is in the use position 36.

In the various embodiments, the configuration of the stowable rear seat 10, when disposed in the downward stowed position 38, places the seatback 22 within a minimal volume in front of the forward wall 60 and below the rim 18 of the base 16. In this manner, the usable storage spaces above the base 16, within the receptacle 20 and around the base 16 are maximized due to the minimal volume and compact configuration of the seatback 22 in the stowed position 38.

Referring again to FIGS. 1-5, the base 16 of the stowable rear seat 10 is substantially rectangular and includes a bottom wall 80 and side walls 82 that further define the receptacle 20 for the placement of items when the stowable rear seat 10 is disposed in the stowed position 38. A portion of the rim 18 proximate the rearward wall 62 defines a recess 84, wherein the recess 84 is configured to receive at least a portion of the lower section 26 of the seatback 22 when the seatback 22 is in the open position 30 and the frame members 34 are in the use position 36. The recess 84 and the lower section 26 of the seatback 22 can include a cooperative interference mechanism such that the lower section 26 of the seatback 22 can be selectively secured within the recess 84 when the stowable rear seat 10 is disposed in the use position 36. Such interference mechanisms can include, but are not limited to, a detent/indent connection, cooperating protrusions, tabs, or other similar interference connection. Alternatively, the recess 84 and the lower section 26 of the seatback 22 can include a mechanical connection that is used to substantially and selectively secure the lower section 26 of the seatback 22 within the recess 84. Such mechanical connections can include, but are not limited to, pins, hasps, clasps, and other similar mechanical connections. In various embodiments, the base 16 can also include various accessory features 86, such as cup holders, hooks, compartments, and the like. In the various embodiments, the base 16 of the stowable rear seat 10 can be integrally formed with the floor surface 72 of the vehicle 14 or can be a separate piece coupled with the floor surface 72, such that the base 16 is secured to the floor surface 72 of the vehicle 14. The mechanism that couples the base 16 to the floor surface 72 can be a substantially sturdy connection that is configured to withstand ordinary forces experienced during occupation of the vehicle 14, as well as extraordinary forces experienced during impacts and crashes involving a vehicle 14, such as, but not limited to, welding, bolting, and other similar coupling mechanisms.

Referring now to FIGS. 1-7, a lower hinge 100 is disposed proximate the rearward wall 62 of the base 16, wherein the lower hinge 100 is configured to operably couple the frame members 34 to the base 16. The lower hinge 100 is configured such that the frame members 34 are operable between the use and stowed positions 36, 38. The lower hinge 100 can be an individual hinge or can be a pair of hinges disposed on either side of the rearward wall 62 of the base 16. The lower hinge 100 can also include a lower locking mechanism 102, wherein the lower locking mechanism 102 serves to selectively and alternatively secure the frame members 34 in the use and stowed positions 36, 38. The lower locking mechanism 102 includes a lower release member 104, wherein the user can selectively activate the lower release member 104 to remove the frame members 34 from either the use or stowed positions 36, 38, so that the seatback 22 can be placed in the other of the use and stowed positions 36, 38. It is contemplated that the lower locking mechanism 102 can be automatic, wherein the lower locking mechanism 102 is configured to automatically engage when the frame members 34 are disposed in either one of the use or stowed positions 36, 38, or both. In various alternate embodiments, a motor can be coupled to the lower hinge 100 to automatically operate the frame members 34 between the use and stowed positions 36, 38.

Figure 8:
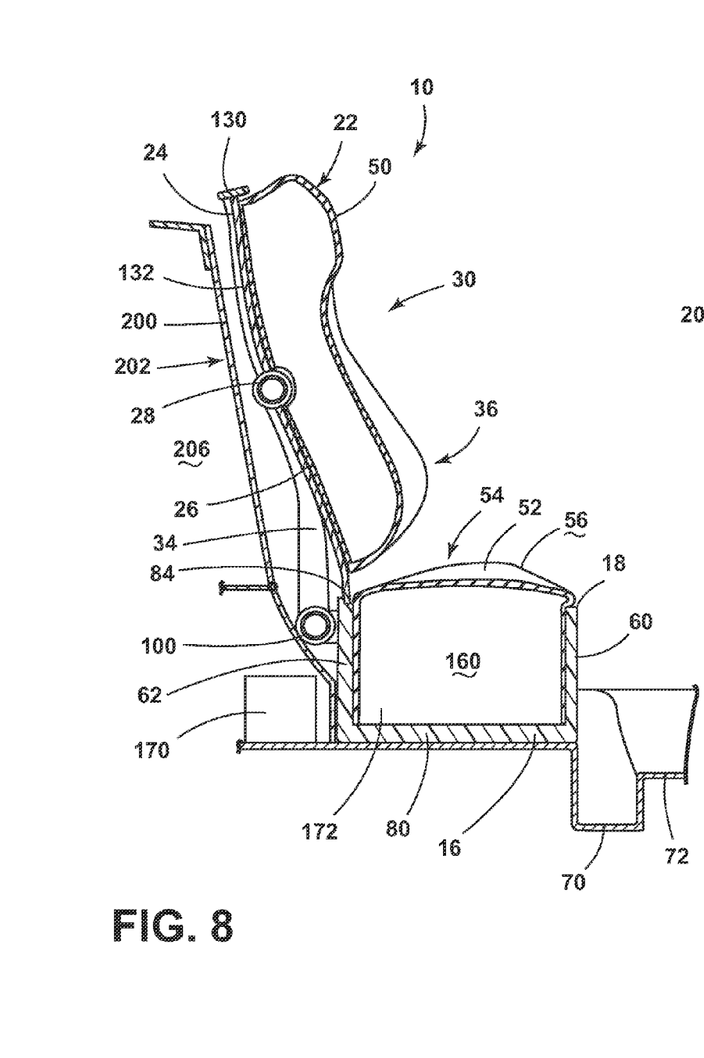
FIG. 8 is a cross-sectional view of the embodiment of FIG. 6 taken at line VIII-VIII.
Figure 9:
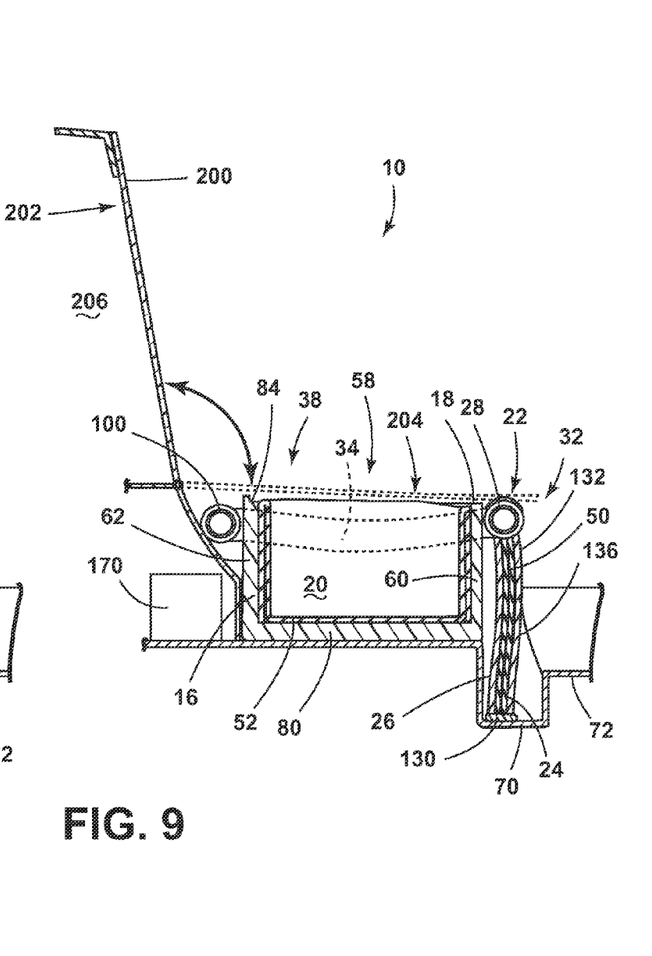
FIG. 9 is a cross-sectional view of the embodiment of FIG. 7, taken at line IX-IX.

Referring now to FIGS. 8 and 9, the frame members 34 are configured to rotate about the lower hinge 100 to rotate the seatback 22 approximately 90° from the lower stowed position 38 to the upward use position 36, and back. It is contemplated that the lower hinge 100 can also be configured to rotate the frame members 34 beyond 90° to allow the seatback 22 to recline to provide added comfort to the occupant of the stowable rear seat 10. In the various embodiments, the lower hinge 100 can be configured to selectively secure the frame members 34 at any predetermined angle between the lower stowed position 38 and the upper use position 36, as well as a reclined position beyond the use position 36.

Referring again to FIGS. 2-9, the frame members 34 extend from the lower hinge 100 to the intermediate hinge 28 disposed proximate the seatback 22, wherein the intermediate hinge 28 operably couples the upper and lower sections 24, 26 of the seatback 22 together, and also operably couples the seatback 22 to the frame members 34. In various embodiments, a hinge cylinder 110 is disposed proximate the intermediate hinge 28 that extends between left and right hinge members 112, 114 of the intermediate hinge 28 to provide added structural support to the seatback 22. In various embodiments, the intermediate hinge 28 can include a securing mechanism 116 to provide added support for the seatback 22 when the frame members 34 are in the use position 36. In this manner, the securing mechanism 116 is configured to allow the intermediate hinge 28, or a portion of the seatback 22 to engage at least a portion of the vehicle 14 body or a portion of the frame of the vehicle 14. As such, the securing mechanism 116 is configured to selectively secure and add structural integrity to the frame members 34 to account for sudden forces placed upon the frame members 34 and the stowable rear seat 10, such as during an impact, sudden braking, or sudden acceleration conditions. The securing mechanism 116 can include, but is not limited to, hooks, latches, and other similar connecting mechanisms.

Referring again to FIG. 2, the upper and lower sections 24, 26 of the seatback 22 are configured to operate between the open and closed positions 30, 32. The upper section 24 of the seatback 22 includes a perimeter lip 130 that extends from a back surface 132 of the upper section 24, wherein the perimeter lip 130 is configured to engage an outer perimeter 134 of the lower section 26 when the upper and lower sections 24, 26 are disposed in the closed position 32. In this manner, the upper and lower sections 24, 26 of the seatback 22 substantially form an enclosure 136, wherein the upper and lower sections 24, 26 serve to selectively and substantially secure the inflatable back cushion 50 therein to provide protection to the inflatable back cushion 50 when the seatback 22 is disposed in the closed position 32. In various embodiments, the intermediate hinge 28 can also include an upper locking mechanism 150 having an upper release member 152 that is configured to selectively secure the upper and lower sections 24, 26 of the seatback 22 within the open and closed positions 30, 32. It is also contemplated that mechanical fasteners can be disposed on the upper and lower sections 24, 26 of the seatback 22 to secure the seatback 22 in the closed position 32 to substantially prevent vibrations between the upper and lower sections 24, 26 of the seatback 22 in the closed position 32 during operation of the vehicle 14.

Figure 2:
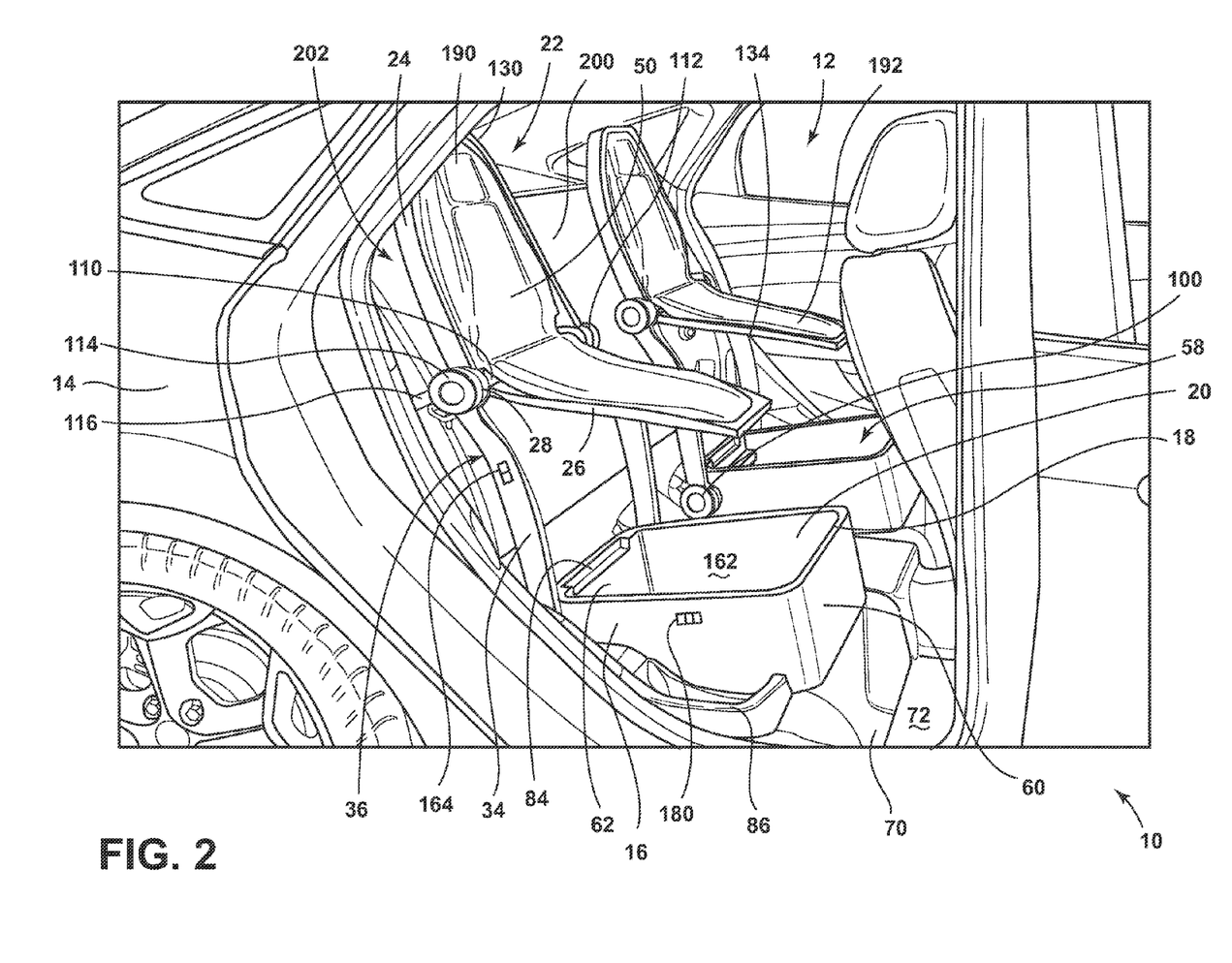
FIG. 2 is a side perspective view of the embodiment of FIG. 1 with the vehicle seating assembly deflated and the seatback moving to a closed position.
Figure 3:
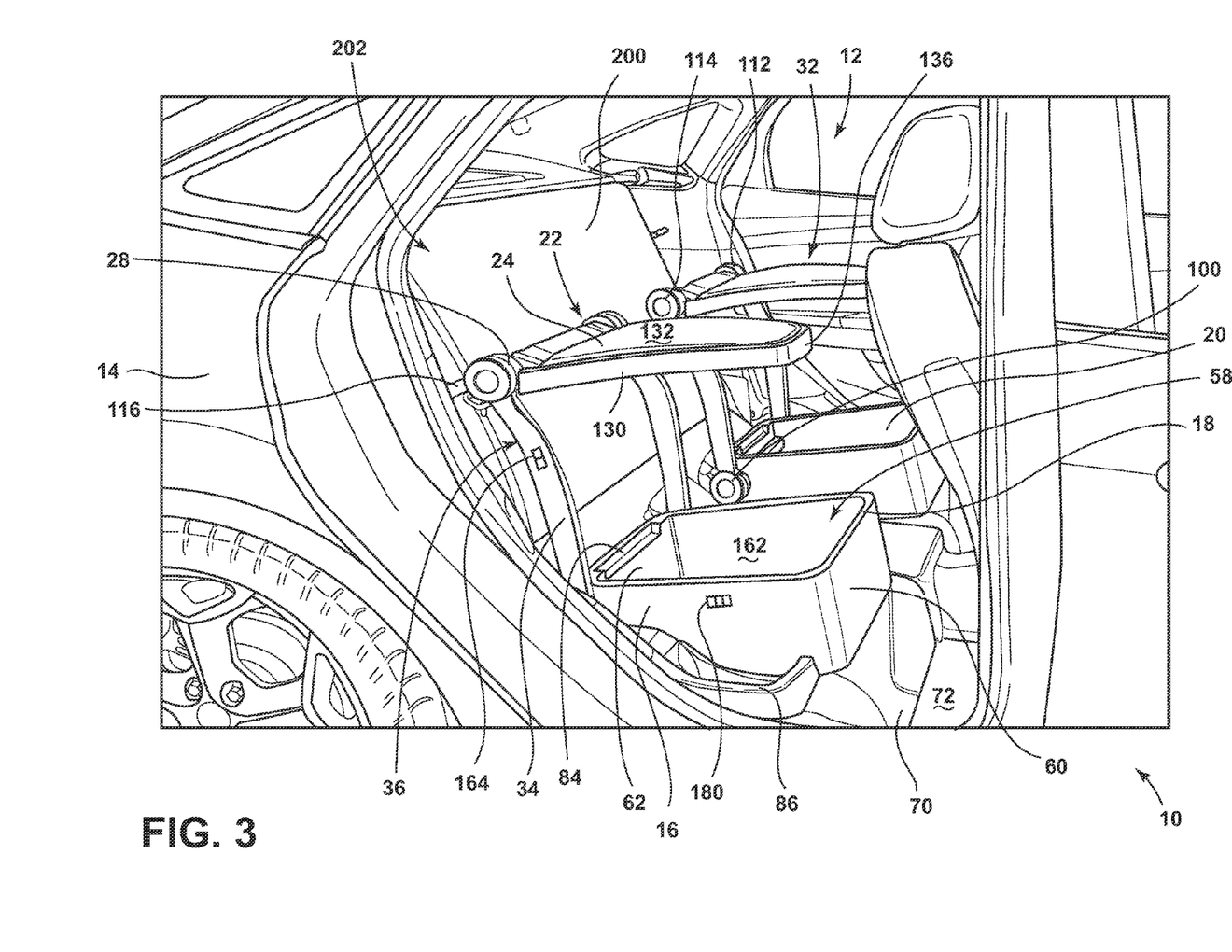
FIG. 3 is a side perspective view of the embodiment of FIG. 1 with the seatback in the closed position.
Figure 4:
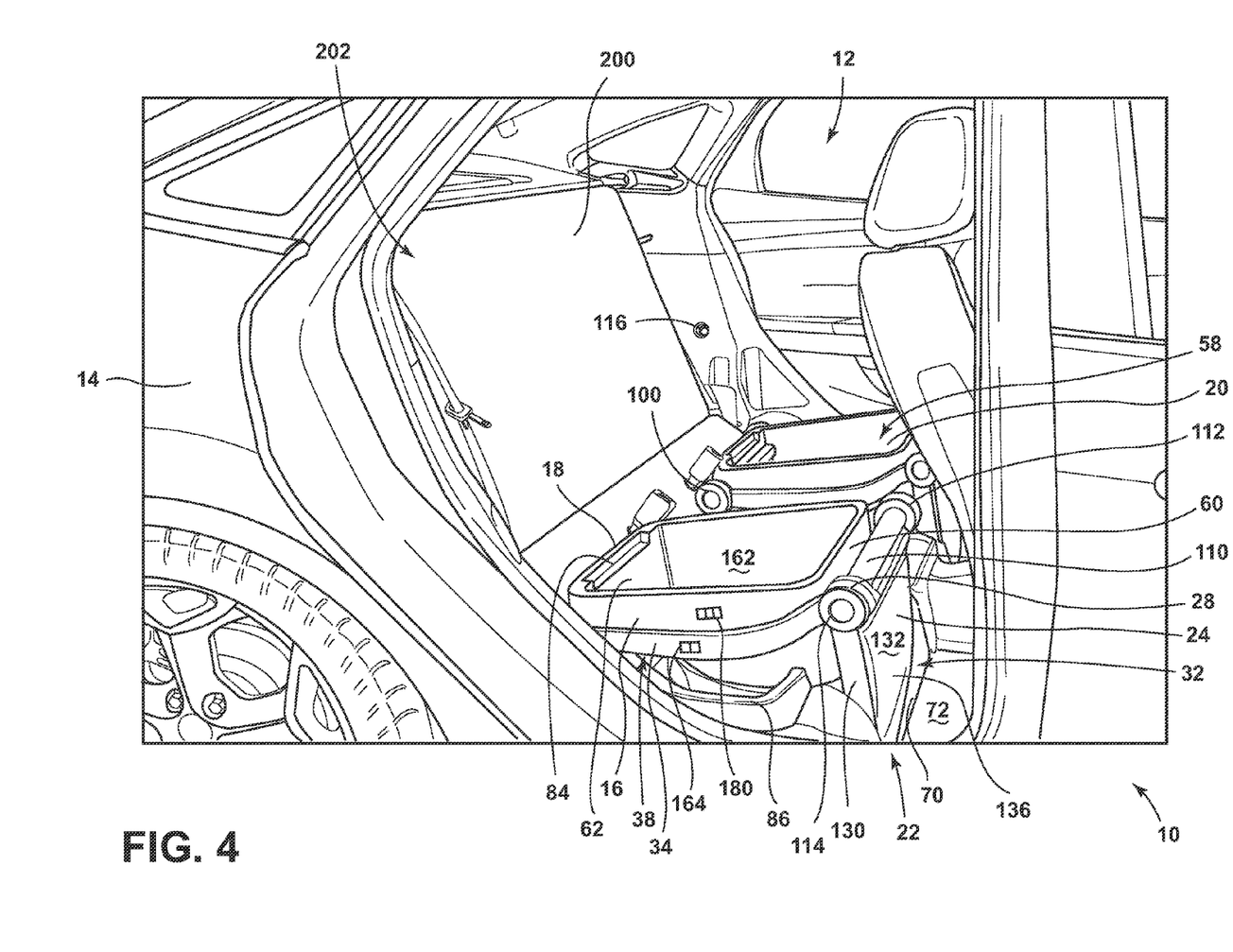
FIG. 4 is a side perspective view of the embodiment of FIG. 1 with the vehicle seating assembly in the stowed position.

The intermediate hinge 28 is configured to allow the upper section 24 of the seatback 22 to rotate forward approximately 90°. It is also contemplated that the rear section of the seatback 22 is configured to rotate around the intermediate hinge 28 approximately 90° to meet the upper section 24 of the seatback 22 to further define the closed position 32 of the upper and lower sections 24, 26 of the seatback 22.

In various embodiments, when the seatback 22 is disposed in the closed position 32, and the seatback 22 is disposed below the rim 18 and in front of the forward wall 60 of the base 16, the concave portion 70 of the floor surface 72 of the vehicle 14 can include a shape that is substantially similar to that of the seatback 22 in the closed position 32. Additionally, it is contemplated that the seatback 22 and the concave portion 70 of the floor surface 72 can include a cooperative interference or mechanism or mechanical connection that is configured to selectively secure the seatback 22 within the concave portion 70 of the floor surface 72 to substantially prevent movement and/or vibration of the seatback 22 when the stowable rear seat 10 is disposed in the stowed position 38.

Referring again to FIG. 2, the upper locking mechanism 150 is configured to selectively secure the upper and lower sections 24, 26 of the seatback 22 in the open or closed position 30, 32, or both. The upper locking mechanism 150 can be automatic such that when the seatback 22 is disposed in either the open or closed position 30, 32, the upper locking mechanism 150 automatically engages to selectively secure the seatback 22 within that respective position. Alternatively, the upper locking mechanism 150 can engage when the seatback 22 is disposed in only the open position 30. The upper locking mechanism 150 can be operated by a frame user interface 164 that is disposed proximate the intermediate hinge 28, wherein the frame user interface 164 can include, but is not limited to, buttons, levers, or other similar user interface. It is contemplated that the frame user interface 164 for the intermediate hinge 28 can be cooperative with the lower hinge 100, such that the operation of the upper release member 152 for the upper locking mechanism 150 for the intermediate hinge 28 also releases the lower locking mechanism 102 of the lower hinge 100 or vice versa. In this manner, the frame members 34 and the upper and lower sections 24, 26 of the seatback 22 can be disposed between the use position 36 and the stowed position 38 through a single user interface.

In various embodiments, the intermediate hinge 28 and the lower hinge 100 can be configured in communication such that the operation of the frame members 34 between the use and stowed positions 36, 38 automatically operates the seatback 22 between the open and closed position 30, 32. In this manner, moving the frame members 34 from the use position 36 toward the stowed position 38 automatically operates the upper and lower sections 24, 26 of the seatback 22 from the open position 30 to the closed position 32, and vice versa.

In various embodiments, the user interface for the locks of the intermediate and lower hinges 28, 100 can be distal from the intermediate and lower hinges 28, 100 to prevent an inadvertent release of the lower and upper locking mechanisms 102, 150 of the stowable rear seat 10. Various embodiments can also include safety features such as child locks, lock-out features that prevent operation of the locks when the vehicle 14 is in motion, and other similar safety features designed to prevent an inadvertent release of the stowable rear seat 10 from the use position 36.

In the various embodiments, the base 16, the frame members 34, the intermediate and lower hinges 28, 100, and the upper and lower sections 24, 26 of the seatback 22 can be made of various rigid and sturdy materials that can include, but are not limited to, composites, metals, plastics, combinations thereof, or other substantially rigid and sturdy materials.

Referring again to FIGS. 1-9, the base 16 of the stowable rear seat 10 includes the selectively inflatable seat cushion 52 that is operable between the inflated seating position 54 and the deflated storage position 58. The inflatable seat cushion 52 is coupled with the base 16, and forms a substantially airtight cavity 160 defined by the inflatable seat cushion 52 and the base 16. The inflatable seat cushion 52 can be coupled with the base 16 proximate the rim 18, as well as a plurality of locations along an inner surface 162 of the base 16, such as proximate the bottom wall 80, a location between the rim 18, and the bottom wall 80, etc. In various embodiments, the inflatable seat cushion 52 can be a self-contained, air-tight membrane that is disposed within the receptacle 20 of the base 16, wherein a portion of the outer surface of the membrane is adhered to at least a portion of the inner surface 162 of the base 16.

Referring again to FIGS. 8 and 9, the inflatable seat cushion 52 is in communication with a compressor 170 disposed proximate the stowable rear seat 10, wherein the compressor 170 supplies gas 172, such as air, to the cavity 160 of the inflatable seat cushion 52 for inflation. The compressor 170 can also be configured to draw gas 172 out from the cavity 160 of the inflatable seat cushion 52 for deflation. It is further contemplated that the compressor 170 can also be configured to selectively supply gas 172 to, and draw gas 172 from, the cavity 160 to maintain a predetermined pressure within the inflatable seat cushion 52. In this manner, when vertical loads are placed upon the inflatable seat cushion 52, such as that of an occupant, or, in the event of a gas 172 leak within the inflatable seat cushion 52, the compressor 170 is configured to automatically activate to supply gas 172 to, or draw gas 172 from, the cavity 160 as necessary to maintain the predetermined pressure. Various embodiments can also include a user interface 180 for an inflation assembly, wherein the user interface 180 is engaged to select a predetermined pressure for the inflatable seat cushion 52 to provide a custom-fit comfort to the occupant of the stowable rear seat 10 during use. The user interface 180 is in communication with the compressor 170, as well as a power source for the compressor 170. In various embodiments, the gas 172 used to inflate the seat cushion 52 can include, but is not limited to, external air, gas 172 kept within a reservoir, such as nitrogen, or air, or other substantially inert gaseous media.

Referring again to FIGS. 1-9, the seatback 22 includes the selectively inflatable back cushion 50 that is also in communication with the compressor 170, wherein the compressor 170 can provide the same functionality to the inflatable back cushion 50 as to the inflatable seat cushion 52, as described above. In this manner, the compressor 170, through the user interface 180, can provide gas 172 to, and draw gas 172 from, the inflatable back cushion 50 to inflate, deflate, or maintain a predetermined pressure within the inflatable back cushion 50. In various embodiments, the inflatable back cushion 50 can include separate individual cushions, such that the upper and lower sections 24, 26 of the seatback 22 include selectively inflatable upper and lower back cushions, respectively. It is also contemplated that separate cushions can be provided, such as for a headrest 190, a lumbar support 192, etc. In such an embodiment, the headrest 190 and/or lumbar support 192 can include individual controls on the user interface 180, whereby an interior air pressure can be maintained that is different from the pressure maintained within the inflatable seat cushion 52 and the inflatable back cushion 50.

In operation, as illustrated in FIGS. 1-9, the inflatable seat cushion 52 and the inflatable back cushion 50 can be operated through the use of the user interface 180 that includes, but is not limited to, buttons, touch screens, levers, and the like. The user interface 180 is in communication with the compressor 170 and the inflatable back and seat cushions 50, 52 to supply gas 172 to, or draw gas 172 from, the respective cushions, as required by the user. In various alternate embodiments, the operation of the inflatable back and seat cushions 50, 52 can be operated by the position of the frame members 34 and the upper and lower sections 24, 26 of the seatback 22, such that when the frame members 34 are in the use position 36 and the seatback 22 is in the open position 30, the compressor 170 is automatically engaged to supply gas 172 to the inflatable back cushion 50 and the inflatable seat cushion 52 for the user to sit in the stowable rear seat 10. It is contemplated that when the stowable rear seat 10 is removed from the stowed position 38 in front of the forward wall 60 of the base 16 and below the rim 18, the compressor 170 is automatically engaged to supply gas 172 to the inflatable seat cushion 52 and the inflatable back cushion 50 as the frame members 34 are moved to the use position 36 and the stowable rear seat 10 is moved to the open position 30.

In various embodiments, when the stowable rear seat 10 is in the use position 36 and the inflatable seat cushion 52 and the inflatable back cushion 50 are both inflated, the deflation of the cushions 50, 52 can be initiated by the user interface 180, which can be engaged to activate the compressor 170 to draw air out from the inflatable seat cushion 52 and the inflatable back cushion 50. Alternatively, the deflation of the inflatable base 16 and cushions 50, 52 can be accomplished by the movement of the frame members 34 and/or the upper and lower sections 24, 26 of the seatback 22. In such an embodiment, the disengagement of the securing mechanism 116 that selectively secures the intermediate hinge 28 to the vehicle 14 frame in the use position 36 can initiate communication to the compressor 170 to draw air out of the inflatable back and seat cushions 50, 52. Alternatively, individual movements of either the frame members 34 or the foldable back, or both, can initiate a communication to activate the compressor 170 to deflate the inflatable back and seat cushions 50, 52. In various alternate embodiments, the inflation and/or deflation of the inflatable back and seat cushions 50, 52 can be independent. In such an embodiment, the inflatable seatback 22 can be deflated, the upper and lower sections 24, 26 of the seatback 22 placed within the closed position 32, and the seatback 22 placed within the stowed position 38, while the inflatable seat cushion 52 remains inflated.

In various embodiments, the frame user interface 164 and the user interface 180 can be included within a single master user interface for the stowable rear seat 10. In such an embodiment, the operation of the frame members 34 and the seatback 22 and the operation of the compressor 170 are controlled by the master user interface.

It is contemplated that in various embodiments, the frame user interface 164 is disposed proximate the stowable rear seat 10, such as on the base 16, one of the frame members 34, or on a B-pillar proximate the stowable rear seat 10. In various alternate embodiments, a separate set of user interface controls can be disposed distal from the stowable rear seat 10. In such an embodiment, a lock-out feature can be included, wherein the controls proximate the stowable rear seat 10 can be selectively disengaged, similar to a child safety lock. In this manner, only the controls distal from the stowable rear seat 10 can selectively serve to control the operation of the stowable rear seat 10.

In the various embodiments, the inflatable back and seat cushions 50, 52 can be made of materials that can include, but are not limited to, nylon, polymers, plastics, and other materials that are substantially airtight and that can be used as an inflatable cushion.

As illustrated in FIG. 1-9, two individual stowable rear seats 10 are included within the cabin 12 of the vehicle 14. It is contemplated that a single bench-type stowable rear seat can also be implemented in the rear of the vehicle cabin 12. Additionally, the stowable rear seat 10, as described above, can also be used for the front passenger seat. In such an embodiment, the controls that operate the position of the front passenger seat (fore, aft, up, down, tilt, etc.) are disposed below the seat base 16 of the inflatable seat cushion 52.

Figure 10:
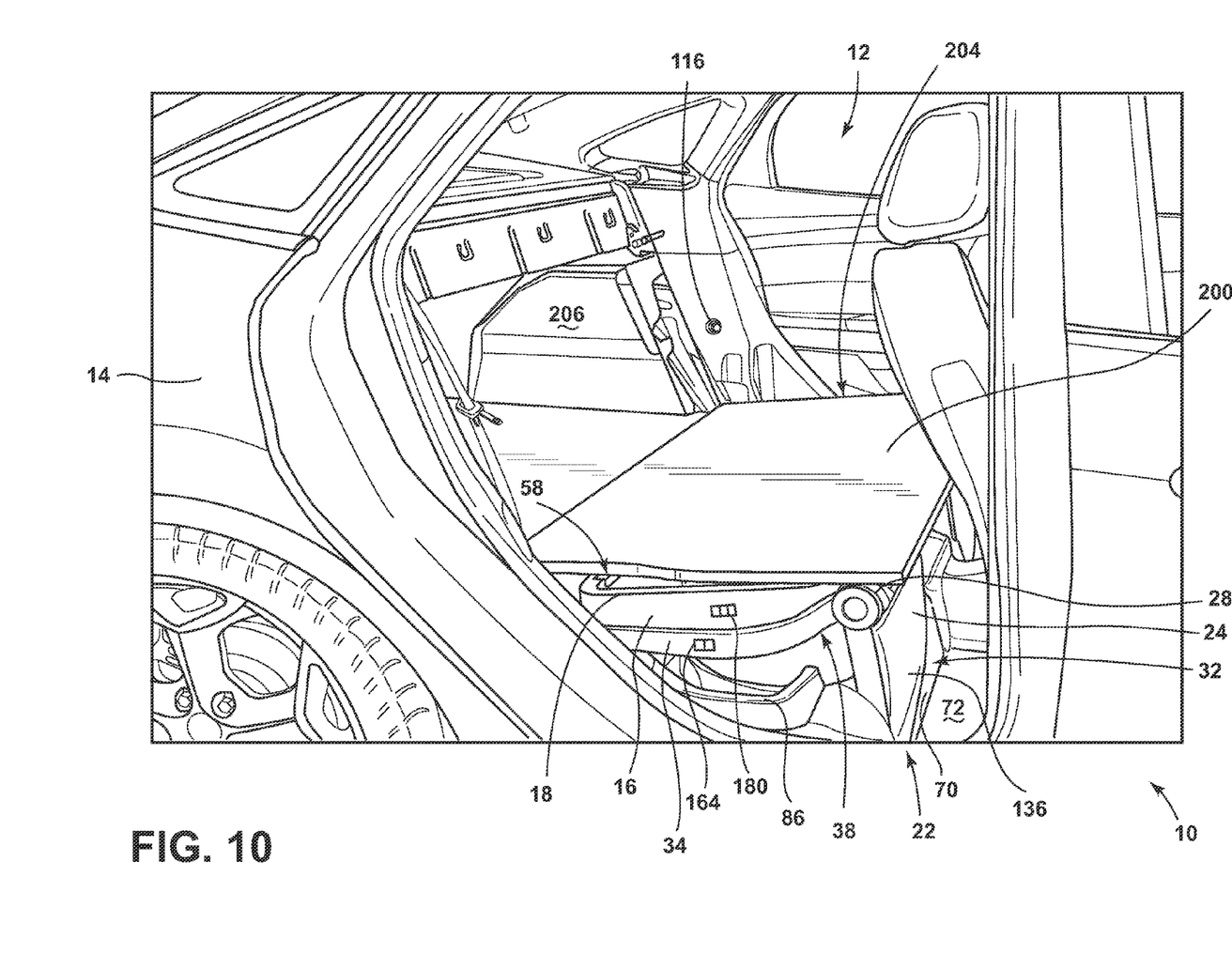
FIG. 10 is a side perspective view of an alternate embodiment of the vehicle seating assembly in the stowed position and a rear panel disposed in a downward position.

Referring now to FIG. 10, when the stowable rear seat 10 is disposed in the stowed position 38, a rear cabin panel 200 can be operated between upward and downward positions 202, 204, wherein when the rear cabin panel 200 is disposed in the downward position 204, the rear cabin panel 200 covers the rim 18 of the base 16 of the stowable rear seat 10. The upward position 202 of the rear cabin panel 200 allows for the stowable rear seat 10 to be moved from the stowed position 38 to the use position 36. In various embodiments, the rear cabin panel 200 can include multiple individual panels that can be operated between upward and downward positions 202, 204 depending upon the position of the individual stowable rear seats 10. In various embodiments, when the rear cabin panel 200 is disposed in the downward position 204, the trunk 206 is placed in communication with the cabin 12 of the vehicle 14, such that a single continuous storage volume is created between the trunk 206 and the rear of the vehicle cabin 12.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly comprising:
    a base having an upper rim and a receptacle below the rim;
    a seatback having upper and lower sections operable at an intermediate hinge between opened and closed positions; and
    frame members operably coupling the base with the seatback, and operable between a use position, wherein the seatback is above the base, and a stowed position, wherein the seatback is in front of and below the rim.

2. The vehicle seating assembly of claim 1, wherein the seatback includes a selectively inflatable back cushion, and wherein the back cushion is deflated when the seatback is in the closed position.

3. The vehicle seating assembly of claim 2, further comprising:
    a selectively inflatable seat cushion operable between an inflated seating position, wherein a top surface of the seat cushion extends above the rim of the base, and a deflated storage position, wherein the seat cushion is stored in the receptacle.

4. The vehicle seating assembly of claim 3, wherein the back cushion and the seat cushion are inflated when the seatback is in the open position and the frame members are in the use position.

5. The vehicle seating assembly of claim 1, wherein the upper section of the seatback is rotatable forward approximately 90 degrees, and wherein the frame members rotate the seatback forward approximately 90 degrees.

6. The vehicle seating assembly of claim 1, wherein the rim of the base includes a recess proximate a back of the base, wherein the recess is configured to receive at least a portion of the lower section when the seatback is in the open position and the frame members are in the use position.

7. The vehicle seating assembly of claim 1, wherein the upper and lower sections of the seatback include selectively inflatable upper and lower back cushions, respectively.

8. A vehicle seating assembly comprising:
    a base having forward and rearward walls and defining a receptacle;
    a seat cushion positioned over the receptacle;
    a foldable seatback proximate the base and operable between opened and closed positions, wherein the foldable seatback includes an upper section and a lower section, and wherein the closed position is defined by a forward surface of the upper section engaging a forward surface of the lower section; and
    frame members supporting the foldable seatback, the frame members operable between an upright use position above the rearward wall, and a downward stowed position, wherein the foldable seatback is in front of the forward wall.

9. The vehicle seating assembly of claim 8, wherein the foldable seatback includes a selectively inflatable back cushion, and wherein the back cushion is deflated when the foldable seatback is in the closed position.

10. The vehicle seating assembly of claim 9, further comprising:
    a selectively inflatable seat cushion operable between an inflated seating position, wherein a top surface of the seat cushion extends above the base, and a deflated storage position, wherein the seat cushion is stored in the receptacle.

11. The vehicle seating assembly of claim 10, wherein the back cushion and the seat cushion are inflated when the foldable seatback is in the open position and the frame members are in the use position.

12. The vehicle seating assembly of claim 8, wherein the frame members include an intermediate hinge.

13. The vehicle seating assembly of claim 8, wherein the upper and lower sections of the foldable seatback include distinct inflatable upper and lower back cushions, respectively.

14. The vehicle seating assembly of claim 8, wherein the upper section of the seatback is rotatable forward approximately 90 degrees, and wherein the frame members rotate the seatback forward approximately 90 degrees.

15. A selectively inflatable and stowable seat for a vehicle, the seat comprising:
    a base having a rim and defining a receptacle below the rim;
    a seatback having upper and lower sections operable at a hinge between opened and closed positions; and
    frame members connecting the base and the hinge, and operable between a use position, wherein the seatback is in the open position and disposed above the base, and a stowed position, wherein the seatback is in the closed position and disposed in front of the base.

16. The selectively inflatable and stowable seat of claim 15, further comprising:
    a selectively inflatable back cushion disposed on the seatback, wherein the back cushion is deflated when the seatback is in the closed position; and
    a selectively inflatable seat cushion disposed within the base and operable between an inflated seating position, wherein a top surface of the seat cushion extends above the rim of the base, and a deflated storage position, wherein the seat cushion is disposed in the base.

17. The selectively inflatable and stowable seat of claim 16, wherein the back cushion and the seat cushion are inflated when the seatback is in the open position and the frame members are in the use position.

18. The selectively inflatable and stowable seat of claim 17, wherein rim of the base includes a recess proximate a back of the base, wherein the recess is configured to receive at least a portion of the lower section when the seatback is in the open position and the frame members are in the use position.

19. The selectively inflatable and stowable seat of claim 15, wherein the upper and lower sections of the seatback include distinct inflatable upper and lower back cushions, respectively.

* * * * *